US012783387B2

(12) United States Patent
Nicolae

(10) Patent No.: US 12,783,387 B2
(45) Date of Patent: Nov. 3, 2026

(54) METHOD FOR TAKING FEEDBACK INTO ACCOUNT IN A SOFTWARE TEST

(71) Applicant: Robert Bosch GmbH, Stuttgart (DE)

(72) Inventor: Maria Irina Nicolae, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 262 days.

(21) Appl. No.: 18/624,465

(22) Filed: Apr. 2, 2024

(65) Prior Publication Data

US 2024/0354233 A1 Oct. 24, 2024

(30) Foreign Application Priority Data

Apr. 20, 2023 (DE) ..................... 10 2023 203 626.6

(51) Int. Cl.
*G06F 11/3668* (2025.01)
*G06F 11/3604* (2025.01)
*G06N 20/00* (2019.01)

(52) U.S. Cl.
CPC ...... *G06F 11/3676* (2013.01); *G06F 11/3608* (2013.01); *G06F 11/3684* (2013.01); *G06F 11/3688* (2013.01); *G06N 20/00* (2019.01)

(58) Field of Classification Search
CPC .................................................. G06F 11/3668
See application file for complete search history.

(56) References Cited

U.S. PATENT DOCUMENTS

| | | | | |
|---|---|---|---|---|
| 11,829,692 | B1 * | 11/2023 | Zorian | G06F 30/27 |
| 12,072,790 | B1 * | 8/2024 | Pearson | G06F 11/3676 |
| 2002/0002698 | A1 * | 1/2002 | Hekmatpour | G06F 11/263 716/106 |
| 2016/0350211 | A1 * | 12/2016 | Cecchetti | G06F 11/3696 |
| 2018/0004635 | A1 * | 1/2018 | Murthy | G06F 11/3668 |
| 2019/0391910 | A1 * | 12/2019 | Okazaki | G05B 19/056 |
| 2022/0171697 | A1 * | 6/2022 | Moukahal | G06F 11/3676 |
| 2023/0367704 | A1 * | 11/2023 | Soukup | G06F 11/3688 |
| 2024/0134781 | A1 * | 4/2024 | Hu | G06F 11/3676 |

OTHER PUBLICATIONS

Bottinger, et al.: "Deep Reinforcement Fuzzing," 2018 IEEE Symposium on Security and Privacy Workshops (SPW), 2018, pp. 116-122; <https://wcventure.github.io/FuzzingPaper/Paper/SPW18_Deep.pdf> Downloaded Mar. 29, 2024.

(Continued)

*Primary Examiner* — Jae U Jeon
(74) *Attorney, Agent, or Firm* — NORTON ROSE FULBRIGHT US LLP

(57) ABSTRACT

A method for taking feedback into account in a software test. The method includes: providing at least one target program to be tested; providing program inputs for executing at least one predetermined test case in the at least one target program by means of black box fuzzing; predicting coverage information on the basis of the provided program inputs, wherein the coverage information specifies an effect in the target program which results from the execution of the at least one predetermined test case; using the predicted coverage information as feedback for the software test.

21 Claims, 2 Drawing Sheets

(56) References Cited

OTHER PUBLICATIONS

Caruana, Rich: "Multitask Learning," Machine Learning, vol. 28, (1997), pp. 41-75. <https://link.springer.com/article/10.1023/A:1007379606734>, Downloaded Mar. 29, 2024.

Chen, et al: "Angora: Efficient Fuzzing by Principled Search," 2018 IEEE Symposium on Security and Privacy (SP), IEEE Computer Society, 2018, pp. 711-724; <https://ieeexplore.ieee.org/stamp/stamp.jsp?tp=&arnumber=8418633> Downloaded Mar. 29, 2024.

Drozd and Wagner.: "Fuzzergym: a Competitive Framework for Fuzzing and Learning," Cornell University, 2018, pp. 1-15; <https://arxiv.org/pdf/1807.07490.pdf> Downloaded Mar. 29, 2024.

Manes, "The Art, Science, and Engineering of Fuzzing: a Survey," IEEE Transactions on Software Engineering, vol. 47, No. 11, 2021, pp. 1-21; <https://sci-hub.ru/10.1109/tse.2019.2946563> Downloaded Mar. 29, 2024.

Rajpal, et al.: "Not All Bytes Are Equal: Neural Byte Sieve for Fuzzing," Cornell University, 2017, pp. 1-10; <https://arxiv.org/pdf/1711.04596v1.pdf> Downloaded Mar. 29, 2024.

She, et al.: "MTFuzz: Fuzzing With a Multi-Task Neural Network," ESEC/FSE 2020: Proceedings of the 28th ACM Joint Meeting on European Software Engineering Conference and Symposium On the Foundations of Software Engineering, 2020, pp. 737-749. <https://sci-hub.ru/10.1145/3368089.3409723> Downloaded Mar. 29, 2024.

She et al., "Neuzz: Efficient Fuzzing With Neural Program Smoothing," IEEE Symposium on Security and Privacy (S&P), 2019, pp. 1-15; <https://arxiv.org/pdf/1807.05620. pdf> Downloaded Mar. 29, 2024.

Wu, et al.: "Evaluating and Improving Neural Program-Smoothing-Based Fuzzing," 2022 IEEE/ACM 44th International Conference on Software Engineering (ICSE), 2022, pp. 847-858. <https://dl.acm.org/doi/pdf/10.1145/3510003.3510089> Downloaded Mar. 29, 2024.

* cited by examiner

METHOD FOR TAKING FEEDBACK INTO ACCOUNT IN A SOFTWARE TEST

CROSS REFERENCE

The present application claims the benefit under 35 U.S.C. § 119 of German Patent Application No. DE 10 2023 203 626.6 filed on Apr. 20, 2023, which is expressly incorporated herein by reference in its entirety.

FIELD

The present invention relates to a method for taking feedback into account in a software test. Furthermore, the present invention relates to a training method, a model, a computer program, a device, and a storage medium for this purpose.

BACKGROUND INFORMATION

In the related art, it is described that a black box fuzzing setup can be used to test a program without access to the source text. For this purpose, a seed body and a fuzzer can be used to generate and execute program inputs for testing the target program. In this case, a black box fuzzer generates the inputs for the target program without knowing its internal behavior or its implementation.

The non-availability of the source code of the target program prevents the fuzzer from obtaining feedback such as code coverage or path coverage that could guide the generation of additional test cases. The fuzzer therefore tests practically at random and has no way of improving over time. This is customary, for example, when testing embedded devices and their software. A further application of black box fuzzing is provided for programs which do not have any deterministic outputs with respect to their inputs.

SUMMARY

An object of the present invention is to provide a method, a training method, a model, a computer program, a device, and a computer-readable storage medium. Features and details of the present invention are disclosed herein. Features and details which are described in connection with the method according to the present invention naturally also apply in connection with the training method according to the present invention, the model according to the present invention, the computer program according to the present invention, the device according to the present invention and the computer-readable storage medium according to the present invention, and vice versa in each case, so that reference is or can always be made to the individual aspects of the present invention reciprocally with respect to the disclosure.

An object of the present invention is to provide a method for taking feedback into account in a software test. Taking the feedback into account can mean, for example, that feedback is obtained via the software test, and the software test can be adapted using the feedback. This is provided, for example, in the case of so-called "gray box fuzzing", in that a code coverage of a target program during the execution of a test case is ascertained and evaluated for the generation of new test cases. However, in the case of black box fuzzing, feedback such as the code coverage cannot conventionally be ascertained since, for example, the source code of the target program is unavailable, in particular if it cannot be accessed.

In an example embodiment of a method according to the present invention, the following steps can be provided, in particular to obtain feedback in a target program despite the non-availability of the source code:

- providing at least one or more target program(s) to be tested,
- providing program inputs for the target program for executing at least one predetermined test case in the at least one provided target program on the basis of black box fuzzing, i.e., in particular without access to the source code of the target program, wherein the execution of the test case is preferably executed by means of black box fuzzing,
- predicting coverage information on the basis of the provided program inputs, wherein the coverage information specifies an effect in the at least one provided target program which results from the execution of the at least one predetermined test case, and results in particular from the input of the provided program inputs in the at least one provided target program,
- using the predicted coverage information as feedback for the software test, preferably by taking into account the coverage information when generating new test cases, preferably by evaluating the coverage information by a fuzzer.

An effect such as a code coverage can thus be predicted for a target program based on the program inputs. In this way, a black box fuzzer can be expanded by the prediction and preferably by a machine learning model such as an artificial neural network, to predict the capability of a test case in order to increase the effect such as the code coverage. The success of the software test can thus be improved by automated optimization.

In an example embodiment of the present invention, it can be an advantage that black box fuzzing is guided by the prediction and, for example, by a machine learning model, even though it has no access to the internals of the target program. The present invention relates in particular to the dynamic software test method of fuzzing, expanded by machine learning. In this case, the fuzzing can specifically be executed as a black box fuzzing in which the source code of the tested program is unavailable or is not accessed. Fuzzing is explained in more detail, e.g., in [5], the references in square brackets being listed at the end of the description.

Fuzzing makes it possible for the target program to be monitored for exceptions such as crashes, failed integrated code assertions or potential memory leaks. In this case, fuzzers can be used to test target programs that process the structured inputs. This structure is specified, e.g., in a specific format or protocol, and distinguishes between valid and invalid inputs. An effective fuzzer can therefore generate semi-valid inputs that are "valid enough" to not be rejected directly by the target program but cause unexpected behaviors in the deeper regions of the target program and are "invalid enough" to reveal corner cases that have not been handled correctly. Fuzz testing or fuzzing can thus comprise an automated process in which randomly generated inputs are sent to a target program and the reaction of the target program is observed. A fuzzer, also referred to as a fuzzing engine, is accordingly in particular software which automatically generates inputs. It is possible for the fuzzer to be neither connected to the target program to be tested nor to be instrumented. Known examples of fuzzers are afl and libfuzzer.

The software to be tested can also be referred to as a target program or fuzz target. In particular, a target program is understood as in particular a software program having a plurality of functions or also only one function that is to be tested by fuzzing. A main feature of a fuzz target can be that it uses potentially untrustworthy inputs that are generated by the fuzzer during the fuzzing process. Furthermore, a fuzz test can be provided which represents the combined version of a fuzzer and a fuzz target. A fuzz test can be executable. The fuzzer can also start, observe, and stop a plurality of running fuzz tests (for example, hundreds or thousands per second), each with a somewhat different input generated by the fuzzer.

According to an example embodiment of the present invention, a test case can be a specific input and/or a test run of a fuzz test. In order to ensure reproducibility, relevant test runs (display the new code paths or crashes) can be stored. In this way, a specific test case with the corresponding input can also be run on a fuzz target which is not connected to a fuzzer, e.g., in its release version.

Furthermore, within the scope of the present invention, it can be provided that the effect is a code coverage, preferably a line, and/or branch and/or path coverage, and preferably specifies the source code of the target program which is executed during the execution of the at least one predefined test case. In other words, the code coverage can indicate how much and/or which source code is executed when the test case is executed. The effect such as the code coverage can be displayed by the coverage information in particular as digital information. The coverage information can thus be used as feedback during the fuzzing in order to identify whether an input has caused the execution of new code paths or blocks. This makes it possible, for example, for the fuzzing to be designed as mutation-based fuzzing. In this case, new program inputs are generated by making small changes to existing inputs (also called seeds) which continue to keep the input valid, but trigger a new behavior. A seed is an initial program input which can be used as a starting point for mutation-based fuzzing. Seeds can generally be provided by the user. The energy of a seed is the number of test cases which can be produced from a seed by mutations. The performance plan is the importance that a mutation-based fuzzer assigns to the seeds, which directly affects the order in which the seeds are queued for mutation.

According to an example embodiment of the present invention, it is also advantageous if the coverage information is predicted by a model, preferably a machine learning model, wherein the model preferably results from training by means of training test cases and their effect on a target program. For example, a training method according to the invention can be used for this purpose.

Furthermore, within the scope of the present invention, it is optionally possible for the at least one predetermined test case to be executed by means of black box fuzzing, in other words therefore without access to internals and/or a source code of the target program. A direct access to a source code of the target program for ascertaining the effect may therefore be prevented and/or avoided. Instead, a fuzzer may be provided which does not receive feedback regarding the effect by a direct ascertainment but by the prediction of the effect, i.e., by the predicted coverage information.

Advantageously, it can be provided in an example embodiment of the present invention that the following step is provided:

- generating at least one new test case on the basis of the at least one predetermined test case and the predicted coverage information, wherein the new test case is preferably optimized for increasing the effect, preferably a code coverage, in the target program.

For this purpose, for example, an optimization method may be used which optimizes the generation of the new test case on the basis of the feedback so that the effect is increased, for example the code coverage is increased.

According to an example embodiment of the present invention, it is also possible for the black box fuzzing to be transformed into gray box fuzzing by using the predicted coverage information. In this case, the fuzzing can still be regarded as black box fuzzing since direct access to the source code for detecting the coverage information is not provided.

Nevertheless, by the prediction of the coverage information, it can be achieved that the fuzzing is performed in the manner of gray box fuzzing. In other words: instead of detected coverage information (e.g., by accessing the source code of the target program), the predicted coverage information is used as feedback in order to perform gray box fuzzing based on the execution of the test case according to the black box fuzzing and the prediction, and thus generate new test cases based on the feedback.

Another object of the present invention is a training method for a model, preferably a machine learning model, for predicting coverage information for a software test, preferably in order to expand a black box fuzzing with feedback provided by the coverage information. According to an example embodiment of the present invention, the training method includes the following steps:

- providing training data, wherein the training data specify training test cases and their effect, such as a code coverage, on a target program to be tested,
- training the model for predicting the coverage information on the basis of the provided training data, wherein the coverage information specifies the effect,
- providing the trained model, preferably for expanding the black box fuzzing.

The training method according to the present invention thus brings with it the same advantages as have been described in detail with reference to a method according to the present invention. In addition, the object of the present invention can be the model trained in this way.

The target program can, for example, be part of an embedded system. The target program and/or the embedded system can provide an autonomous driving function or another control function for an at least semi-autonomous robot, in particular for an autonomous vehicle. The vehicle can, for example, be designed as a motor vehicle and/or passenger vehicle.

The present invention also relates to a computer program, in particular a computer program product, comprising instructions which, when the computer program is executed by a computer, cause the computer to carry out the method according to the present invention. The computer program according to the present invention thus brings with it the same advantages as have been described in detail with reference to a method according to the present invention.

The present invention also relates to a device for data processing that is configured to carry out the method according to the present invention. For example, a computer which executes the computer program according to the present invention can be provided as the device. The computer can have at least one processor for executing the computer program. A non-volatile data memory can also be provided, in which the computer program is stored and from which the computer program can be read by the processor for execution.

The present invention also relates to a computer-readable storage medium which has the computer program according to the present invention and/or comprises instructions which, when executed by a computer, cause it to carry out the method according to the present invention. The storage medium is designed, for example, as a data store such as a hard drive and/or a non-volatile memory and/or a memory card. The storage medium can be integrated into the computer, for example.

Furthermore, the method according to the present invention can also be carried out as a computer-implemented method.

Further advantages, features and details of the present invention will become apparent from the following description, in which exemplary embodiments of the present invention are described in detail with reference to the figures. The features mentioned in the description can be essential to the present invention in each case individually or in any combination.

DETAILED DESCRIPTION OF EXAMPLE EMBODIMENTS

Figure 1:
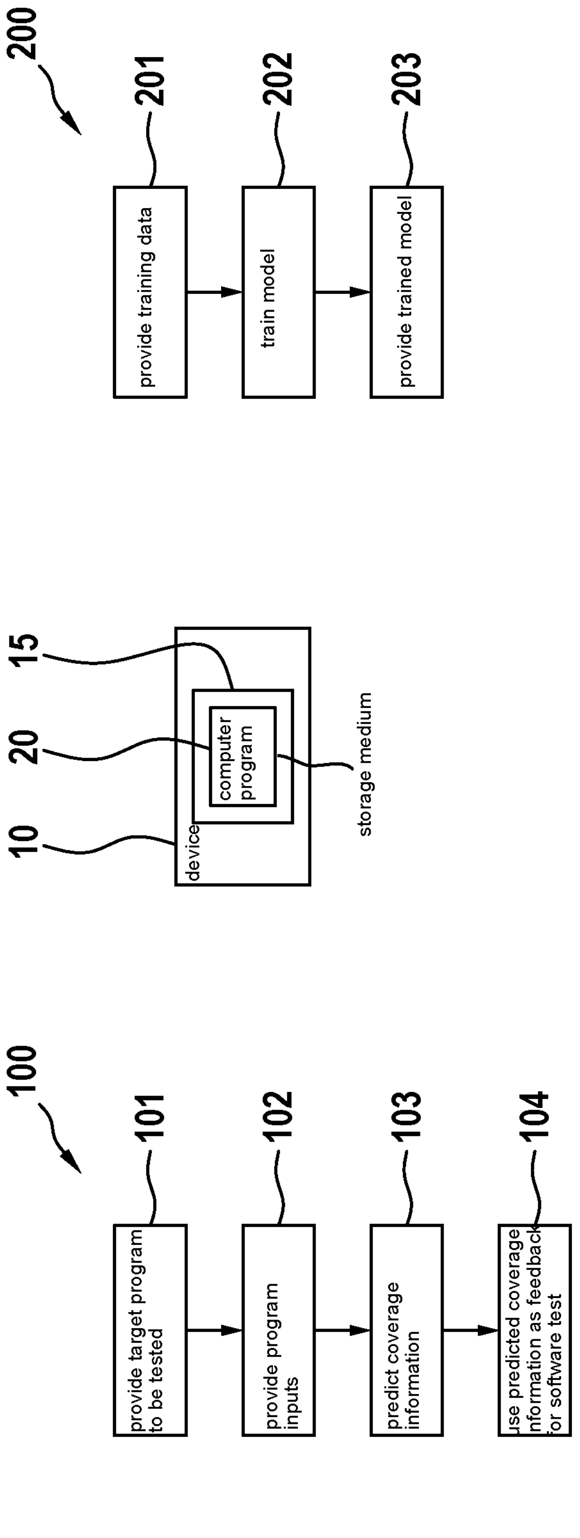
FIG. 1 shows a schematic visualization of a method, a device, a training method, a model, a storage medium and a computer program according to exemplary embodiments of the present invention.

FIG. 1 schematically shows a method 100, a device 10, a storage medium 15, a model 50, a training method 200 and a computer program 20 according to exemplary embodiments of the present invention. The method 100 can be used to take feedback into account in a software test. The software test is, for example, fuzzing, preferably black box fuzzing that is expanded with feedback. According to a first method step 101, at least one target program 140 to be tested can be provided. Subsequently, according to a second method step 102, program inputs can be provided for executing at least one predetermined test case 150 in the at least one target program 140 on the basis of black box fuzzing. This is to be understood in particular as meaning that, when the test case 150 is executed, no access to the internals of the target program 140 is possible for ascertaining an effect such as a code coverage. According to a third method step 103, coverage information 120 can subsequently be predicted on the basis of the provided program inputs. This can be understood to mean that the provided program inputs can be used as input for an algorithm such as a machine learning model 50 in order to perform the prediction. The coverage information 120 can specify the effect in the target program 140 which results from the execution of the at least one predetermined test case 150. It is therefore not necessary to ascertain the effect by accessing internals as the source code of the target program 140 in order to obtain the predicted coverage information 120 as feedback and use it according to a fourth method step 104 for the software test. Further use includes, for example, generating a new test case 150 based on the feedback in the form of gray box fuzzing in which, for example, a seed is mutated. The effect can be code coverage, preferably a line, and/or branch and/or path coverage, and thus specify the source code of the target program 140 which is executed during the execution of the at least one predetermined test case 150.

Furthermore, the coverage information 120 can be predicted by a model 50, preferably a machine learning model 50, wherein the model 50 preferably results from training by means of training test cases 118 and their effect on a target program 140. For this purpose, a training method 200 can be provided for the model 50 for predicting the coverage information 120 for the software test. According to a first training step 201, training data can be provided which specify training test cases 118 and their effect on a target program 140 to be tested. For this purpose, annotation data can be provided which, for example, have been ascertained by detecting the effect in gray box fuzzing. Subsequently, the model 50 can be trained according to a second training step 202 for predicting the coverage information 120 on the basis of the provided training data. According to a third training step 203, the trained model 50 can then be provided for expanding black box fuzzing with feedback provided by the coverage information.

In cases in which there is no source code, black box fuzzing can be regarded as a standard test method. However, the majority of fuzzing research concentrates on the improvement of fuzzing in the gray box or white box configuration since the black box configuration is most difficult to improve due to the lack of feedback for the fuzzer. Machine learning has already been used to improve fuzzing. Neural byte sieve [6] experiments with several types of recurrent neural networks which learn to predict optimal locations in the input byte in order to execute mutations. Angora [3] uses taint tracking on the byte level and gradient descent to mutate test cases in the direction of a new coverage. FuzzerGym [4] and Bottinger et al. [1] formulate fuzzing as a reinforcement learning problem that optimizes coverage. Neural program smoothing ([8], [7], [9]) learns to predict the code coverage of a program on the basis of program inputs, with the aim of using gradient descent to generate new test cases. However, none of these works are applicable to black box fuzzing since they have been developed for a gray box setup in which the code coverage and other internals of the program are available.

In particular, it is an inventive concept of exemplary embodiments of the invention to expand a black box fuzzer with a neural network that can predict the capability of a test case 150 to increase the code coverage. The code coverage can e.g., be designed as line, and/or branch and/or path coverage. Line, branch, and path coverage are different types of code coverage in software tests. In the case of line coverage, it can be checked whether each individual code line is executed at least once. For example, it is measured how many of the code lines were executed in a specific code section. However, this does not necessarily mean that the code functions correctly. There can still be gaps that are not covered. Branch coverage aims to execute each individual branch within the code at least once. In this case, it is checked whether any condition that leads to a branch is evaluated at least once. For example, if there are two conditions that can lead to two different branches, both must be evaluated in order to achieve branch coverage. Path coverage is the most complete form of the mentioned code coverages. All possible paths are followed through the code to ensure that each path is executed at least once. Thus, if there are several branches, all combinations of conditions must be tested to ensure that each path is covered by the code. It can thus be ensured that the code has been completely tested.

Exemplary embodiments of the invention can have the advantage of eliminating the need for a fuzzer to access the internal target program 140 to account for at least one of said code coverages. The fuzzer feedback thus receives feedback information which it can use as instructions for improving the generation of new test cases 150. In other words, the expansion by the model 50 transforms the black box fuzzing into gray box fuzzing. The model 50 thus allows the fuzzer to perform all operations of a gray box fuzzer (e.g., evolutionary or mutation-based test case generation instead of random generation), despite the lack of access to the internals of the target program 140.

A supervised learning configuration can be provided in which the model 50 learns to predict the code coverage for a target program 140 on the basis of the program inputs. In other words, the learning method can be suitable for training the model 50 such that it can process program inputs and predict the coverage. For this purpose, the machine learning model 50 can be designed, for example, as (at least one) neural network. The idea is in particular to train the model 50 on the basis of coverage information 120 from other programs for which source code or internal program information is available. It is possible for the programs that are to be used for training the model 50 to accept the same type or the same format of the input as the target program 140 to be tested. The advantage can thus be achieved that the predictive power of the trained model 50 is improved for the target program 140. Once the model 50 is trained, it can effectively predict the coverage for new, unseen target programs 140 that are available only with black box access. The resulting system operates, for example, in three phases which are described below with further details.

In a first phase, data acquisition can optionally be provided. The data can, for example, be collected in that an arbitrary gray box fuzzer is executed on the programs selected for the training, and the information that is used by the fuzzer as a quality function is collected as a label for the test cases 150 (in most cases, a type of code coverage). This information is also referred to below as coverage information 120. For each test case 150, one feedback per program that was used for the training can be saved (e.g., for N=5 programs that are used for collecting feedback, each test case would have 5 labels in the form of the coverage obtained for each program). In this way, annotation data can be provided.

The machine learning model 50 can then be trained. For example, a neural network can be trained with the test cases from the previous phase as input. A multitasking setup [2] can be advantageous to account for all coverage information 120 from different programs. In this case, the model 50 has one output head per program that is used for the training set. Each output head can learn to predict the coverage for a program. The last representation of the test case 150 before the outputs of the individual programs are separated is the representation (or embedding) of the test case 150.

Figure 2:
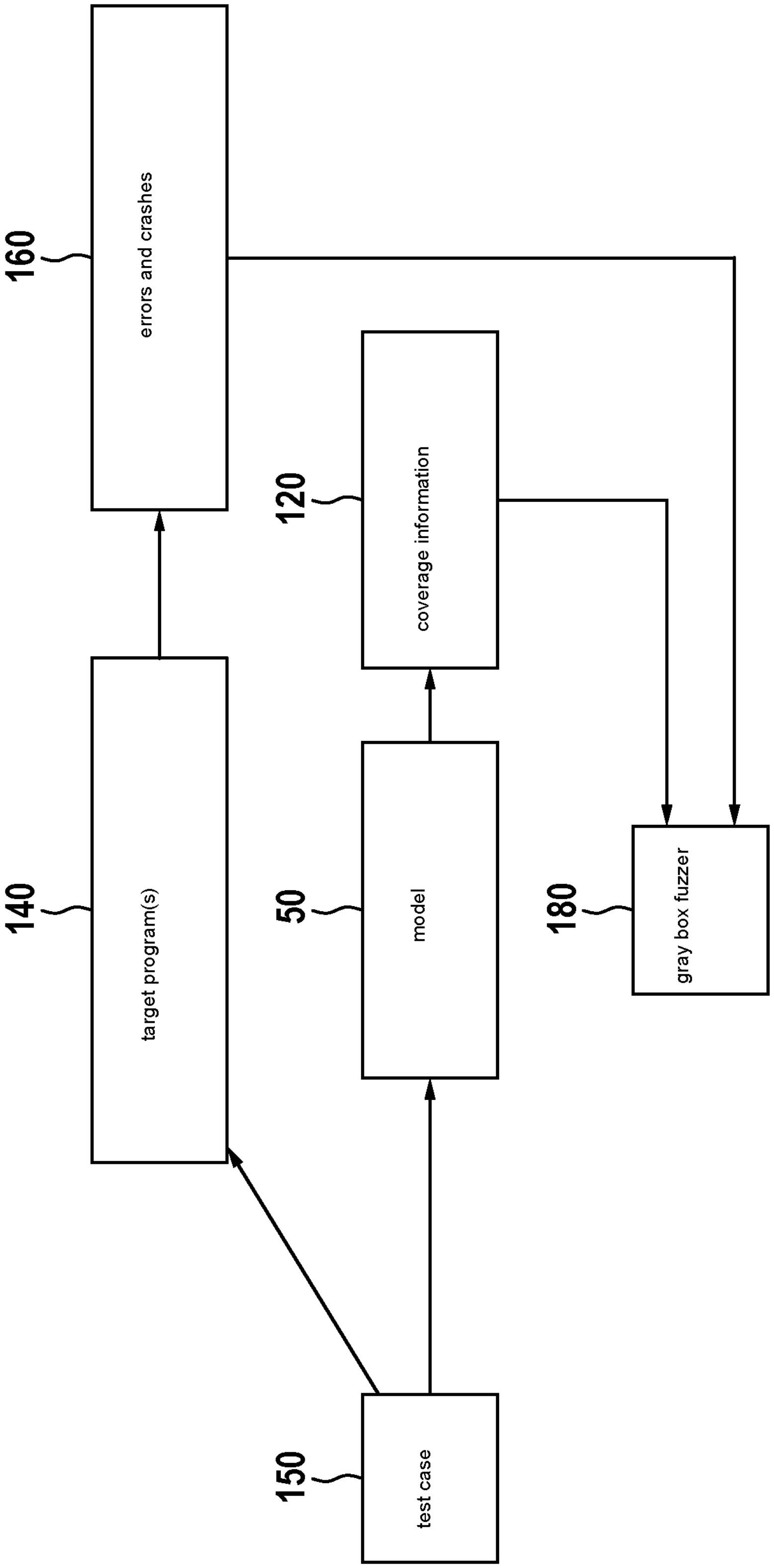
FIG. 2 shows further details relating to exemplary embodiments of the present invention.

Fuzzing can then be provided using the trained model 50. A standard gray box fuzzer 180 can use the predictions of the model 50 from the previous phase in order to convert test cases 150 into new ones. In order to use all the coverage results that the model 50 can predict, they can be summarized, for example, in a score or fitness function that the fuzzer uses as a guiding criterion for evaluating the mutations. It is also possible to use different aggregation functions (e. g., the summation of all coverage predictions for a test case 150). The test cases 150 can be executed both on the (black box) target program 140 in order to observe errors and crashes 160, and also by the trained machine learning model 50 in order to obtain coverage predictions. On the basis of this information, the fuzzer can have all the necessary feedback for controlling mutations in a gray box method. FIG. 2 shows an example of complete fuzzing loop on the basis of model predictions. It is shown that at least one new test case 150 can be generated on the basis of the at least one predetermined test case 150 and the predicted coverage information 120. The new test case 150 can be optimized to increase the effect, preferably a code coverage, in the target program 140.

The above description of the embodiments describes the present invention exclusively in the context of examples. Of course, individual features of the embodiments, provided they make technical sense, can be freely combined with one another without departing from the scope of the invention.

REFERENCES

[1] Konstantin Böttinger, Patrice Godefroid, and Rishabh Singh. Deep reinforcement fuzzing. In IEEE Security and Privacy Workshops (SPW), pages 116-122, 2018.

[2] Rich Caruana. Multitask learning. Machine Learning, 28:41-75, 1997.

[3] Peng Chen and Hao Chen. Angora: Efficient fuzzing by principled search. In IEEE Symposium on Security and Privacy (SP), 2018.

[4] William Drozd and Michael D. Wagner. Fuzzergym: A competitive framework for fuzzing and learning. CoRR, 2018.

[5] Valentin Jean Marie Man es, HyungSeok Han, Choongwoo Han, Sang Kil Cha, Manuel Egele, Edward J Schwartz, and Maverick Woo. The art, science, and engineering of fuzzing: A survey. IEEE Transactions on Software Engineering, 2019.

[6] Mohit Rajpal, William Blum, and Rishabh Singh. Not all bytes are equal: Neural byte sieve for fuzzing. CoRR, 2017.

[7] Dongdong She, Rahul Krishna, Lu Yan, Suman Jana, and Baishakhi Ray. MTFuzz: fuzzing with a multi-task neural network. In ACM Joint European Software Engineering Conference and Symposium on the Foundations of Software Engineering (ESEC/FSE), 2020.

[8] Dongdong She, Kexin Pei, Dave Epstein, Junfeng Yang, Baishakhi Ray, and Suman Jana. Neuzz: efficient fuzzing with neural program smoothing. In IEEE Symposium on Security and Privacy (S&P), 2019.

[9] Mingyuan Wu, Ling Jiang, Jiahong Xiang, Yuqun Zhang, Guowei Yang, Huixin Ma, Sen Nie, Shi Wu, Heming Cui, and Lingming Zhang. Evaluating and improving neural program-smoothing-based fuzzing. In International Conference on Software Engineering (ICSE), 2022.

What is claimed is:

1. A computer-implemented method for taking feedback into account in a software test by controlling black-box fuzzing, comprising the following steps performed by one or more processors:

providing at least one target program to be tested by a black-box fuzzer, wherein source code and internal execution information of the at least one target program are unavailable to the black-box fuzzer or are not accessed by the black-box fuzzer for ascertaining code coverage of the at least one target program during the software test;

providing a trained machine-learning model, wherein the trained machine-learning model has been trained using training data that specifies training test cases and respective code-coverage effects obtained by executing the training test cases for one or more training programs for which source code or internal program information is available, and wherein the one or more training programs accept a same type or same format of program input as the at least one target program;

providing program inputs for the at least one provided target program for executing at least one predetermined test case in the at least one provided target program based on black box fuzzing, wherein the program inputs are generated by the black-box fuzzer;

executing the at least one predetermined test case on the at least one provided target program;

monitoring an externally observable reaction of the at least one provided target program to the program inputs, wherein code-coverage information measured from the execution of the at least one predetermined test case by the at least one provided target program is not provided to the black-box fuzzer;

providing the program inputs of the at least one predetermined test case to the trained machine-learning model;

predicting, by the trained machine-learning model, coverage information based on the provided program inputs, wherein the coverage information specifies a predicted code-coverage effect in the at least one provided target program which results from the execution of the at least one predetermined test case;

using the predicted coverage information as feedback for the software test by generating, based on the predicted coverage information, a feedback score indicating a predicted capability of the at least one predetermined test case to increase code coverage of the at least one provided target program;

controlling operation of the black-box fuzzer based on the feedback score by selecting or prioritizing a seed corresponding to the at least one predetermined test case for mutation; and generating, by the black-box fuzzer, at least one new test case by mutating the selected or prioritized seed, wherein the at least one new test case is generated based on the predicted coverage information to increase predicted code coverage of the at least one provided target program.

2. The method according to claim 1, wherein the predicted code-coverage effect includes a line coverage, a branch coverage, and/or a path coverage.

3. The method according to claim 2, wherein the predicted code-coverage effect specifies source code of the at least one provided target program which is executed during the execution of the at least one predetermined test case.

4. The method according to claim 1, wherein the black box fuzzing is transformed into gray box fuzzing by the black-box fuzzer using the predicted coverage information as surrogate code-coverage feedback in place of code-coverage information measured from execution of the at least one predetermined test case by the at least one provided target program, so that the black-box fuzzer performs coverage-guided mutation of the selected or prioritized seed without receiving measured code-coverage information from the at least one provided target program.

5. The method according to claim 1, wherein the feedback score is generated by aggregating a plurality of coverage predictions output by the trained machine-learning model for the program inputs of the at least one predetermined test case.

6. The method according to claim 5, wherein the plurality of coverage predictions are aggregated by summing the plurality of coverage predictions.

7. The method according to claim 1, wherein the trained machine-learning model comprises a neural network trained using coverage information from a plurality of training programs, and wherein the neural network comprises a respective output head for each of the plurality of training programs, each respective output head being trained to predict coverage information for a corresponding one of the plurality of training programs.

8. The method according to claim 7, wherein the trained machine-learning model generates, from the program inputs of the at least one predetermined test case, a representation of the at least one predetermined test case before outputs of the respective output heads are separated.

9. The method according to claim 1, wherein controlling operation of the black-box fuzzer based on the feedback score comprises assigning, based on the feedback score, an energy to the selected or prioritized seed, wherein the energy specifies a number of test cases to be produced from the selected or prioritized seed by mutation.

10. The method according to claim 1, wherein controlling operation of the black-box fuzzer based on the feedback score comprises assigning, based on the feedback score, an importance to the selected or prioritized seed in a performance plan of the black-box fuzzer, wherein the assigned importance affects an order in which seeds are queued for mutation.

11. The method according to claim 1, wherein the at least one provided target program processes structured inputs having a specified format or protocol, and wherein mutating the selected or prioritized seed comprises generating the at least one new test case by making a change to the selected or prioritized seed that maintains validity of the specified format or protocol while triggering a new behavior of the at least one provided target program.

12. The method according to claim 1, wherein monitoring the externally observable reaction of the at least one provided target program comprises monitoring the at least one provided target program for at least one of a crash, a failed integrated code assertion, or a potential memory leak.

13. The method according to claim 1, wherein the at least one provided target program is part of an embedded system that provides an autonomous driving function or another control function for an at least semi-autonomous robot or vehicle.

14. The method according to claim 1, wherein the trained machine-learning model predicts the coverage information from the program inputs of the at least one predetermined test case without receiving source code or internal execution information of the at least one provided target program for ascertaining the predicted code-coverage effect.

15. A computer-implemented training method for a machine-learning model for predicting coverage information for a software test to expand black box fuzzing with feedback provided by the coverage information, the training method comprising the following steps performed by one or more processors:

providing training data, wherein the training data specify, for each of a plurality of training test cases, (i) program input data of the respective training test case and (ii) annotation data identifying a code-coverage effect obtained by executing the respective training test case on a training target program, wherein the annotation data has been ascertained by detecting the code-coverage effect during gray-box fuzzing of the training target program, and wherein the code-coverage effect includes line coverage, branch coverage, and/or path coverage;

training the machine-learning model for predicting the coverage information based on the provided training data, wherein the coverage information specifies the code-coverage effect, such that the machine-learning model learns to map program input data of a test case to predicted coverage information that specifies a predicted code-coverage effect resulting from execution of the test case by a target program; and providing the trained machine-learning model for expanding the black box fuzzing, wherein the trained machine-learning model is configured, during black-box fuzzing of the target program in which direct access to source code or internal execution information of the target program for ascertaining code coverage is prevented or avoided, to receive program inputs of a black-box-fuzzing test case and to output the predicted coverage information as feedback usable by a black-box fuzzer for generating a new test case by mutation of a seed associated with the black-box-fuzzing test case.

16. The computer-implemented training method according to claim 15, wherein providing the training data comprises executing a gray-box fuzzer on a plurality of training programs selected for training the machine-learning model and collecting, as the annotation data, information used by the gray-box fuzzer as a quality function.

17. The computer-implemented training method according to claim 16, wherein, for each training test case of the plurality of training test cases, the annotation data includes a respective feedback label for each of the plurality of training programs, each respective feedback label indicating coverage obtained for the corresponding training program.

18. The computer-implemented training method according to claim 15, wherein the machine-learning model comprises a neural network trained in a multitask setup, wherein the neural network includes a respective output head for each training program of a plurality of training programs used for training the neural network.

19. The computer-implemented training method according to claim 18, wherein each respective output head is trained to predict coverage for a corresponding one of the plurality of training programs, and wherein a representation of a training test case before outputs of the respective output heads are separated is an embedding of the training test case.

20. A computer system including one or more processors, the one or more processors being configured for taking feedback into account in a software test by controlling black-box fuzzing, the one or more processors being configured to:

provide at least one target program to be tested by a black-box fuzzer, wherein source code and internal execution information of the at least one target program are unavailable to the black-box fuzzer or are not accessed by the black-box fuzzer for ascertaining code coverage of the at least one target program during the software test;

provide a trained machine-learning model, wherein the trained machine-learning model has been trained using training data that specifies training test cases and respective code-coverage effects obtained by executing the training test cases for one or more training programs for which source code or internal program information is available, and wherein the one or more training programs accept a same type or same format of program input as the at least one target program;

provide program inputs for the at least one provided target program for executing at least one predetermined test case in the at least one provided target program based on black box fuzzing, wherein the program inputs are generated by the black-box fuzzer;

execute the at least one predetermined test case on the at least one provided target program;

monitor an externally observable reaction of the at least one provided target program to the program inputs, wherein code-coverage information measured from the execution of the at least one predetermined test case by the at least one provided target program is not provided to the black-box fuzzer;

provide the program inputs of the at least one predetermined test case to the trained machine-learning model;

predict, by the trained machine-learning model, coverage information based on the provided program inputs, wherein the coverage information specifies a predicted code-coverage effect in the at least one provided target program which results from the execution of the at least one predetermined test case;

use the predicted coverage information as feedback for the software test by generating, based on the predicted coverage information, a feedback score indicating a predicted capability of the at least one predetermined test case to increase code coverage of the at least one provided target program;

control operation of the black-box fuzzer based on the feedback score by selecting or prioritizing a seed corresponding to the at least one predetermined test case for mutation; and generate, by the black-box fuzzer, at least one new test case by mutating the selected or prioritized seed, wherein the at least one new test case is generated based on the predicted coverage information to increase predicted code coverage of the at least one provided target program.

21. A non-transitory computer-readable storage medium on which are stored instructions for taking feedback into account in a software test by controlling black-box fuzzing, the instructions, when executed by a computer, causing the computer to perform the following steps:

providing at least one target program to be tested by a black-box fuzzer, wherein source code and internal execution information of the at least one target program are unavailable to the black-box fuzzer or are not accessed by the black-box fuzzer for ascertaining code coverage of the at least one target program during the software test;

providing a trained machine-learning model, wherein the trained machine-learning model has been trained using training data that specifies training test cases and respective code-coverage effects obtained by executing the training test cases for one or more training programs for which source code or internal program information is available, and wherein the one or more training programs accept a same type or same format of program input as the at least one target program;

providing program inputs for the at least one provided target program for executing at least one predetermined test case in the at least one provided target program based on black box fuzzing, wherein the program inputs are generated by the black-box fuzzer;

executing the at least one predetermined test case on the at least one provided target program and monitoring an externally observable reaction of the at least one provided target program to the program inputs, wherein code-coverage information measured from the execution of the at least one predetermined test case by the at least one provided target program is not provided to the black-box fuzzer;

providing the program inputs of the at least one predetermined test case to the trained machine-learning model;

predicting, by the trained machine-learning model, coverage information based on the provided program inputs, wherein the coverage information specifies a predicted code-coverage effect in the at least one provided target program which results from the execution of the at least one predetermined test case;

using the predicted coverage information as feedback for the software test by generating, based on the predicted coverage information, a feedback score indicating a predicted capability of the at least one predetermined test case to increase code coverage of the at least one provided target program;

controlling operation of the black-box fuzzer based on the feedback score by selecting or prioritizing a seed corresponding to the at least one predetermined test case for mutation; and generating, by the black-box fuzzer, at least one new test case by mutating the selected or prioritized seed, wherein the at least one new test case is generated based on the predicted coverage information to increase predicted code coverage of the at least one provided target program.

* * * * *